(12) United States Patent
Matsuoka

(10) Patent No.: US 10,746,273 B2
(45) Date of Patent: *Aug. 18, 2020

(54) DRIVING APPARATUS FOR VEHICLE

(71) Applicant: EXEDY Corporation, Neyagawa-shi, Osaka (JP)

(72) Inventor: Yoshihiro Matsuoka, Neyagawa (JP)

(73) Assignee: EXEDY CORPORATION, Neyagawa-Shi, Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/276,205

(22) Filed: Feb. 14, 2019

(65) Prior Publication Data

US 2019/0301581 A1    Oct. 3, 2019

(30) Foreign Application Priority Data

Mar. 28, 2018   (JP) ................... 2018-061144

(51) Int. Cl.

| F16H 45/02 | (2006.01) |
| F16H 47/08 | (2006.01) |
| F16H 41/24 | (2006.01) |
| H02K 7/116 | (2006.01) |
| H02K 7/108 | (2006.01) |

(52) U.S. Cl.
CPC ............ *F16H 47/08* (2013.01); *F16H 41/24* (2013.01); *F16H 45/02* (2013.01); *H02K 7/1085* (2013.01); *H02K 7/116* (2013.01); *F16H 2041/246* (2013.01)

(58) Field of Classification Search
None
See application file for complete search history.

(56) References Cited

U.S. PATENT DOCUMENTS

| 2010/0078281 A1* | 4/2010 | Kajigai | B60K 6/365 |
| | | | 192/3.28 |
| 2012/0178568 A1* | 7/2012 | Schoenek | B60K 6/48 |
| | | | 475/5 |
| 2013/0035202 A1* | 2/2013 | Ideshio | B60K 6/40 |
| | | | 477/5 |
| 2014/0230423 A1* | 8/2014 | Iwase | B60K 6/26 |
| | | | 60/445 |
| 2017/0328455 A1* | 11/2017 | Li | F16D 21/00 |
| 2019/0305641 A1* | 10/2019 | Matsuoka | F16H 41/24 |
| 2019/0305698 A1* | 10/2019 | Matsuoka | H02K 7/006 |
| 2019/0376589 A1* | 12/2019 | Samie | F16H 41/24 |

FOREIGN PATENT DOCUMENTS

JP    2011-231857 A    11/2011

* cited by examiner

*Primary Examiner* — Justin Holmes
(74) *Attorney, Agent, or Firm* — United IP Counselors, LLC

(57) ABSTRACT

A driving apparatus for a vehicle is disclosed. The driving apparatus is a device used for transmitting drive force to an output shaft. The driving apparatus includes a housing, an electric motor, a torque converter and a rotation transmitting structure. The electric motor includes a first stator fixed to the housing and a rotor configured to be rotate relative to the first stator. The torque converter transmits rotation of the rotor to the output shaft when the rotor rotates in a first rotational direction. The rotation transmitting structure transmits rotation of the rotor to the output shaft when the rotor rotates in a second rotational direction opposite to the first rotational direction.

8 Claims, 4 Drawing Sheets

DRIVING APPARATUS FOR VEHICLE

CROSS-REFERENCE TO RELATED APPLICATIONS

This application claims priority to Japanese Patent Application No. 2018-061144, filed Mar. 28, 2018. That application is incorporated by reference herein in its entirety.

TECHNICAL FIELD

The present disclosure relates to a driving apparatus for a vehicle. More particularly, the present disclosure relates to a driving apparatus for a vehicle which is used for transmitting drive force to an output shaft.

BACKGROUND ART

A conventional driving apparatus for a vehicle includes a motor generator (electric motor) and a torque converter, for example, as disclosed in Japanese Patent Unexamined Publication No. 2011-231857. With this configuration, drive force generated by the motor generator is transmitted to an output shaft via the torque converter.

BRIEF SUMMARY

With the conventional driving apparatus for a vehicle, when the vehicle moves forward, the motor generator rotates in a forward direction to transmit the drive force generated by the motor generator to the output shaft via the torque converter. On the other hand, when the vehicle moves backward, the motor generator rotates in a reverse direction to transmit the drive force generated by the motor generator to the output shaft via the torque converter.

With this configuration, when the motor generator rotates in the reverse direction while the vehicle moves backward, an impeller in the torque converter also rotates in the reverse direction. When the impeller rotates in the reverse direction, the configuration of the torque converter sometimes makes it impossible for torque input to the impeller to be appropriately transmitted to the output shaft via a turbine or stator.

The present advancement has been made in light of the above-mentioned problem and it is an object of the present advancement to provide a driving apparatus for a vehicle which can suitably transmit drive force generated by an electric motor to an output shaft.

A driving apparatus for a vehicle according to one aspect of the present advancement is a device for transmitting drive force to an output shaft. The driving apparatus for a vehicle includes a housing, an electric motor, a torque converter and a rotation transmitting structure.

The electric motor includes a first stator fixed to the housing and a rotor configured to rotate relative to the first stator. When the rotor rotates in a first rotational direction, the torque converter is configured to transmit rotation of the rotor to the output shaft. When the rotor rotates in a second rotational direction opposite to the first rotational direction, the rotation transmitting structure is configured to transmit rotation of the rotor to the output shaft.

With the present driving apparatus for a vehicle, rotation of the rotor is transmitted to the output shaft via the torque converter when the rotor rotates in the first rotational direction. On the other hand, rotation of the rotor is transmitted to the output shaft via the rotation transmitting structure when the rotor rotates in the second rotational direction. In other words, with the present driving apparatus for a vehicle, rotation of the rotor is transmitted to the output shaft via either the torque converter or the rotation transmitting structure according to the rotational direction of the rotor. With this configuration, drive force of the electric motor can be suitably transmitted to the output shaft.

In the driving apparatus for the vehicle according to another aspect of the present advancement, the rotation transmitting structure preferably includes a clutch unit configured to transmit rotation of the rotor to the output shaft when the rotor rotates in the second rotational direction.

With this configuration, when the rotor rotates in the second rotational direction, rotation of the rotor is transmitted to the output shaft via the clutch unit. With this configuration, drive force of the electric motor can be suitably transmitted to the output shaft.

In the driving apparatus for the vehicle according to another aspect of the present advancement, the rotation transmitting structure preferably includes a planetary gear mechanism. In this case, the planetary gear mechanism is configured to transmit rotation of the rotor to the output shaft when the rotor rotates in the second rotational direction.

With this configuration, when the rotor rotates in the second rotational direction, rotation of the rotor is transmitted to the output shaft via the planetary gear mechanism. With this configuration, drive force of the electric motor can be suitably amplified by the planetary gear mechanism to be transmitted to the output shaft.

In the driving apparatus for the vehicle according to another aspect of the present advancement, the torque converter preferably includes an impeller configured to rotate integrally with the rotor, a turbine configured to connect to the output shaft, and a second stator configured to rotate relative to the housing.

With this configuration, drive force of the electric motor can be suitably transmitted to the output shaft via the torque converter when the rotor rotates in the first rotational direction.

In the driving apparatus for the vehicle according to another aspect of the present advancement, the turbine is preferably configured to rotate integrally with the output shaft.

Even with such a configuration, when the rotor rotates in the first rotational direction, drive force of the electric motor can be suitably transmitted to the output shaft via the torque converter.

In the driving apparatus for the vehicle according to another aspect of the present advancement, the turbine is preferably configured to rotate integrally with the output shaft in the first rotational direction and preferably rotate relative to the output shaft in the second rotational direction.

Even with such a configuration, drive force of the electric motor can be suitably transmitted to the output shaft via the torque converter when the rotor rotates in the first rotational direction.

A driving apparatus for a vehicle according to another aspect of the present advancement preferably further includes a lockup structure configured to connect the impeller and the turbine so that the impeller and the turbine rotate integrally.

With this configuration, drive force of the electric motor can be suitably transmitted to the output shaft when the rotor rotates in the first rotational direction.

In the driving apparatus for the vehicle according to another aspect of the present advancement, a case unit of the torque converter has preferably a non-magnetic body.

With this configuration, magnetic force can be prevented from leaking from the electric motor to the torque converter. In other words, the electric motor can be suitably operated.

According to the present advancement, drive force of an electric motor can be suitably transmitted to an output shaft with a driving apparatus for a vehicle.

DETAILED DESCRIPTION

[First Embodiment]
<Overall Configuration>

Figure 1:
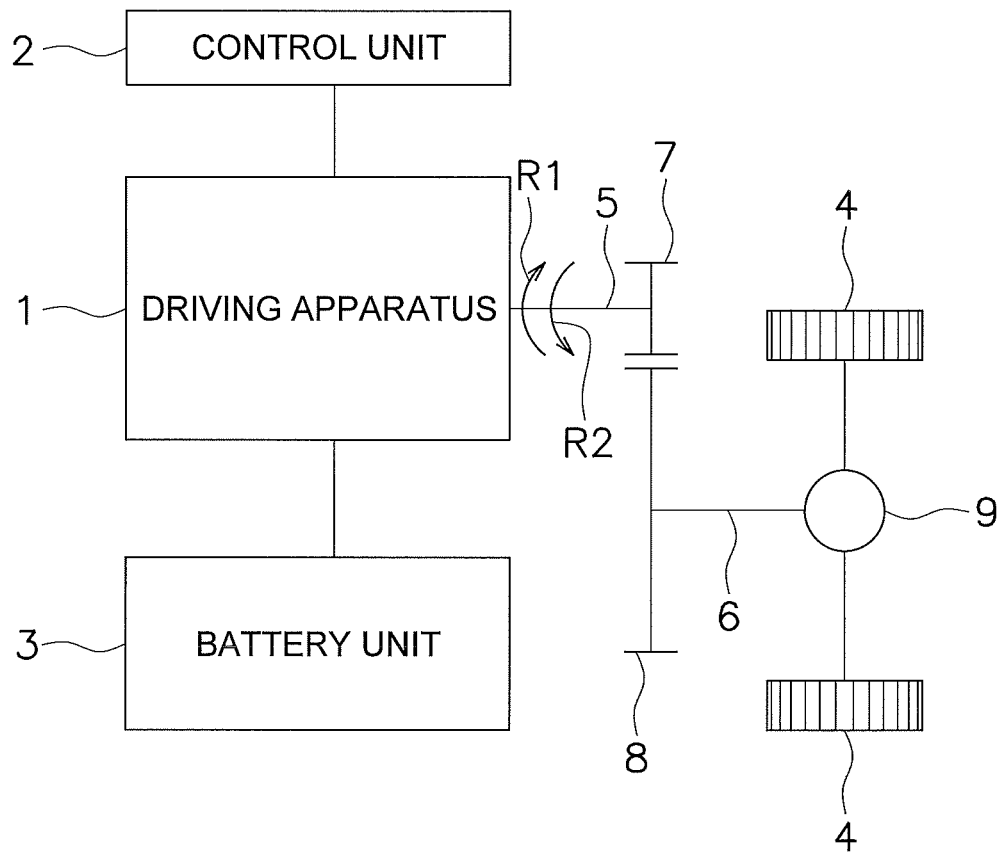
FIG. 1 is a schematic diagram for illustrating the overall configuration of a vehicle according to a first embodiment of the present advancement.

FIG. 1 is a schematic diagram for illustrating the overall configuration of a vehicle provided with a driving apparatus 1 according to the present advancement. The configuration of the driving apparatus 1 is briefly described with reference to FIG. 1. "O-O" is a rotational center.

As illustrated in FIG. 1, the vehicle includes, for example, the driving apparatus 1, a control unit 2 and a battery unit 3. In this embodiment, there is described a case in which the control unit 2 and the battery unit 3 are not included in the driving apparatus 1, but the control unit 2 and the battery unit 3 may be included in the driving apparatus 1.

The driving apparatus 1 is a device used for driving a drive wheel 4. The driving apparatus 1 is mounted to a vehicle body (not shown). The driving apparatus 1 operates by being supplied with electric power from the battery unit 3 and drives the drive wheel 4 via a first output shaft 5 (example of an output shaft) and a second output shaft 6. The first output shaft 5 includes a first gear unit 7. The second output shaft 6 includes a second gear unit 8. The second gear unit 8 meshes with the first gear unit 7. A differential mechanism 9 is disposed between the second output shaft 6 and the drive wheel 4.

According to this configuration, when drive force is transmitted from the driving apparatus 1 to the first output shaft 5, the drive force is transmitted from the second output shaft 6 to a drive shaft of the drive wheel 4 via the differential mechanism 9. As a result, the drive wheel 4 is driven by the driving apparatus 1.

Note that the above-described power transmission path is merely an example and another output shaft or gear unit may be further used to transmit the drive force of the driving apparatus 1 to the drive wheel 4. Details of the driving apparatus 1 are described later.

The control unit 2 controls the driving apparatus 1 and the battery unit 3. The control unit 2 is mounted to the vehicle body. The control unit 2 operates by being supplied with electric power from the battery unit 3.

The battery unit 3 supplies electric power to the driving apparatus 1 and the control unit 2. The battery unit 3 is mounted to the vehicle body. The battery unit 3 can be charged by an external power source. The battery unit 3 can also be charged with electric power generated in the driving apparatus 1.

<Driving Apparatus>

Figure 2:
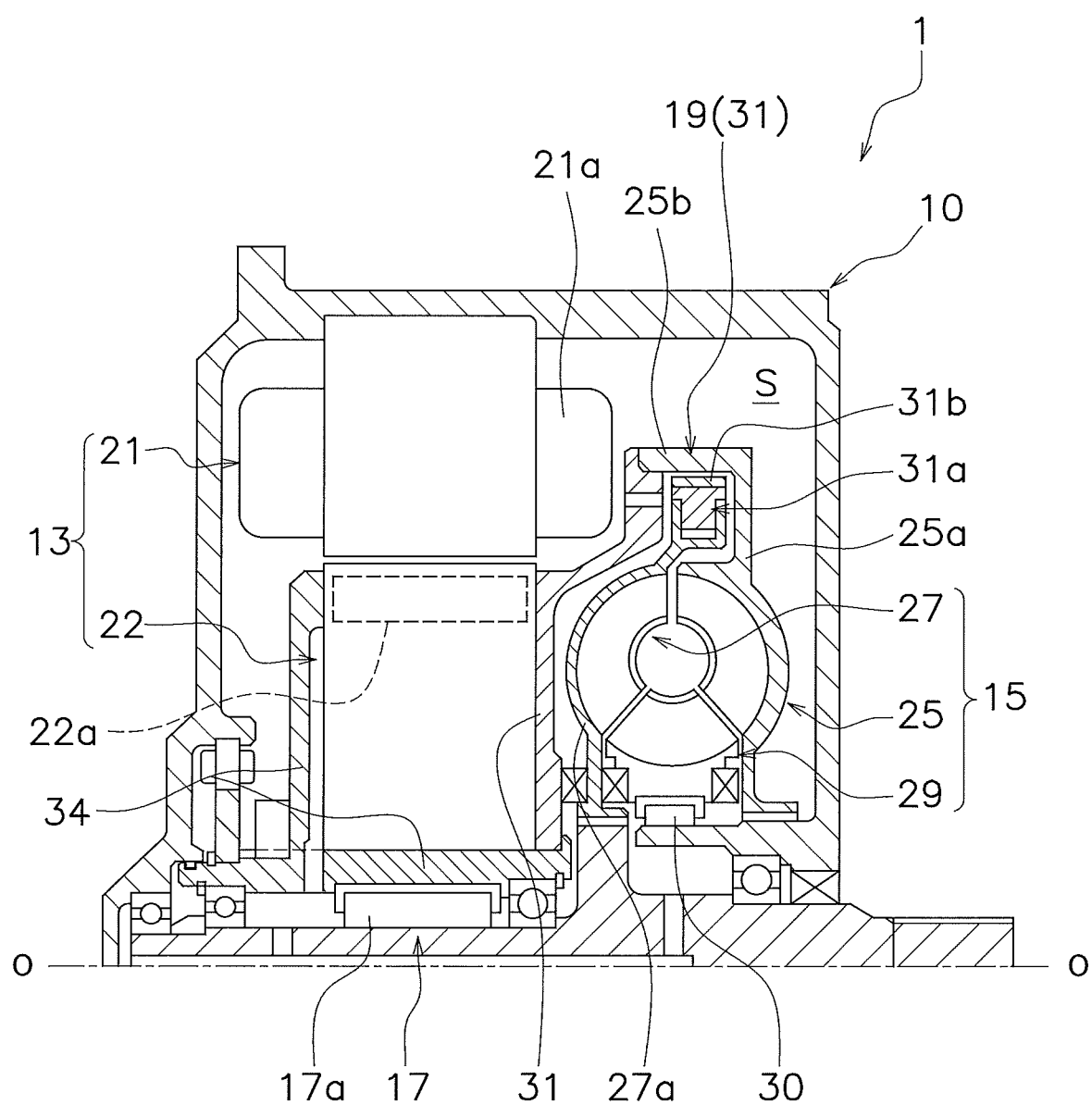
FIG. 2 is a cross-sectional view of a driving apparatus.

The driving apparatus 1 is a device used for transmitting drive force to the first output shaft 5. As illustrated in FIG. 2, the driving apparatus 1 includes a housing 10, a motor 13 (example of an electric motor) and a torque converter 15. The driving apparatus 1 further includes a rotation transmitting structure 17. The driving apparatus 1 further includes a lockup structure 19. The housing 10 is mounted to the vehicle body. The housing 10 has an internal space S.

(Motor)

Figure 3:
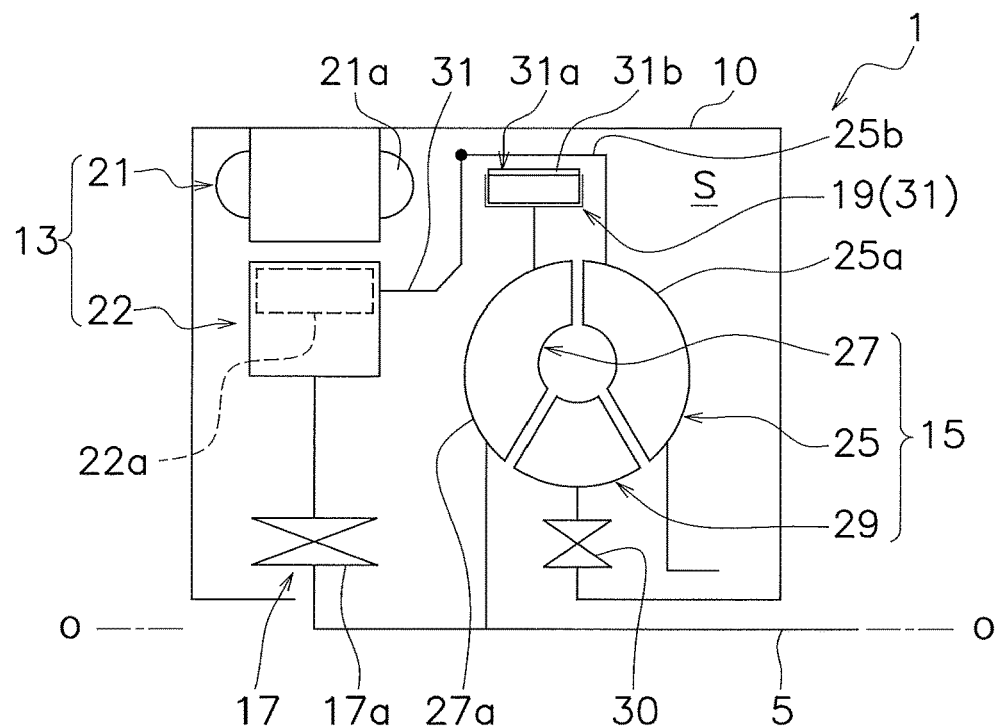
FIG. 3 is a schematic diagram of the driving apparatus.
Figure 4:
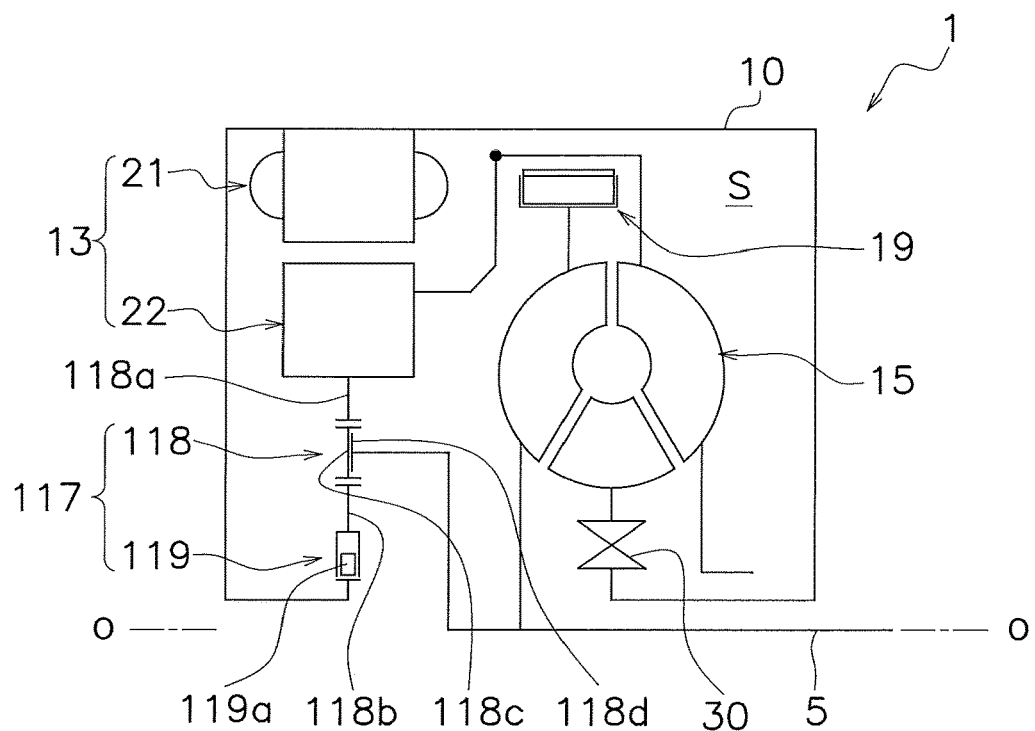
FIG. 4 is a schematic diagram of a driving apparatus according to a second embodiment of the present advancement.

The motor 13 is a drive unit of the driving apparatus 1. As illustrated in FIGS. 2 and 3, the motor 13 is disposed in the internal space S in the housing 10. The motor 13 includes a first stator 21 and a rotor 22. The first stator 21 is fixed to the housing 10. The first stator 21 includes a coil portion 21a.

The rotor 22 is configured to rotate relative to the first stator 21. The rotor 22 is rotatably supported by the first output shaft 5. More specifically, the rotor 22 is rotatably supported by the first output shaft 5 via the rotation transmitting structure 17. The rotor 22 is positioned in the axial direction by a positioning member 34. The positioning member 34 is mounted to the rotor 22 so as to rotate integrally with the rotor 22 and is supported by the first output shaft 5 so as to rotate relative to the first output shaft 5. The rotor 22 includes a magnet unit 22a which has N- and S-poles alternately arranged in the circumferential direction.

Current is supplied from the battery unit 3 to the coil portion 21a of the first stator 21 to generate a magnetic field between the coil portion 21a and the magnet unit 22a. As a result, the rotor 22 rotates relative to the first stator 21 about a rotational axis of the first output shaft 5. Rotation of the rotor 22 is controlled, by the control unit 2, through controlling of the current supplied from the battery unit 3.

(Torque converter)

The torque converter 15 transmits drive force of the motor 13 to the first output shaft 5. More specifically, the torque converter 15 transmits rotation of the rotor 22 to the first output shaft 5 when the rotor 22 rotates in a drive direction R1 (example of a first rotational direction; see FIG. 1). Here, the drive direction R1 is a direction in which the rotor 22 is rotated in order to move the vehicle forward.

As illustrated in FIGS. 2 and 3, the torque converter 15 is disposed inside the housing 10, that is, inside the internal space S in the housing 10. The torque converter 15 includes an impeller 25, a turbine 27 and a second stator 29. The torque converter 15 causes the impeller 25, the turbine 27 and the second stator 29 to rotate using working fluid, so that torque input to the impeller 25 is transmitted to the turbine 27.

The impeller 25 is configured to rotate integrally with the rotor 22. For example, the impeller 25, for example, an impeller shell 25a is fixed to a cover portion 32 and the cover portion 32 is fixed to the rotor 22. The impeller shell 25a of the impeller 25 and the cover portion 32 fixed to the rotor 22 form a torque converter case (example of a case unit). The torque converter case is a non-magnetic body.

The turbine 27 is connected to the first output shaft 5. In this embodiment, the turbine 27 is connected to the first output shaft 5 so as to rotate integrally with the first output shaft 5. A turbine shell 27a of the turbine 27 is disposed between the impeller shell 25a and the cover portion 32. The second stator 29 is configured to rotate relative to the housing 10. For example, the second stator 29 is rotatably disposed in the housing 10 using a one-way clutch 30.

(Rotation Transmitting Structure)

The rotation transmitting structure 17 selectively transmits rotation of the rotor 22 to the first output shaft 5. As illustrated in FIGS. 2 and 3, the rotation transmitting structure 17 is disposed between the rotor 22 and the first output shaft 5 in the internal space S in the housing 10. For example, the rotation transmitting structure 17 includes a one-way clutch 17a (example of a clutch unit).

For example, when the rotor 22 rotates in the drive direction R1, the one-way clutch 17a does not transmit rotation of the rotor 22 to the first output shaft 5. On the other hand, when the rotor 22 rotates in an anti-drive direction R2 (example of a second rotational direction; see FIG. 1), the one-way clutch 17a transmits rotation of the rotor 22 to the first output shaft 5. In this embodiment, the anti-drive direction R2 is a rotational direction opposite to the drive direction R1.

(Lockup Structure)

The lockup structure 19 is disposed in the internal space S in the housing 10. The lockup structure 19 connects the impeller 25 and the turbine 27 so that the impeller 25 and the turbine 27 rotate integrally.

In this embodiment, as illustrated in FIGS. 2 and 3, the lockup structure 19 includes a centrifugal clutch 31. A centrifuge 31a in the centrifugal clutch 31 is mounted in the turbine 27, for example, the turbine shell 27a. More specifically, a plurality of centrifuges 31a which make up the centrifugal clutch 31 are disposed in the circumferential direction (the rotational direction) with intervals therebetween. The plurality of centrifuges 31a are held by the turbine shell 27a so as to move in a radial direction and rotate integrally with the turbine shell 27a.

The plurality of centrifuges 31a are disposed opposing a radially outer side portion 25b of the impeller shell 25a. Each of the plurality of centrifuges 31a includes a friction member 31b. The friction members 31b of the centrifuges 31a are each disposed at an interval from the radially outer side portion 25b of the impeller shell 25a.

More specifically, if centrifugal force is not acting on the plurality of centrifuges 31a, or the centrifugal force acting on the plurality of centrifuges 31a is less than a predetermined centrifugal force, the plurality of centrifuges 31a (friction members 31b) are disposed at an interval from the radially outer side portion 25b of the impeller shell 25a. This state is a "clutch off" state.

On the other hand, a state in which the friction member 31b of each centrifuge 31a abuts against the radially outer side portion 25b of the impeller shell 25a is a "clutch on" state. More specifically, if the centrifugal force acting on the plurality of centrifuges 31a is more than or equal to a predetermined centrifugal force, the plurality of centrifuges 31a (friction members 31b) abut against the radially outer side portion 25b of the impeller shell 25a. With this configuration, the impeller 25 and the turbine 27 are connected to each other so that the impeller 25 and the turbine 27 rotate integrally. This state is the clutch on state.

Through configuring the driving apparatus 1 as described above, when the rotor 22 rotates in the drive direction R1, rotation of the rotor 22 is transmitted to the first output shaft 5 via the torque converter 15. On the other hand, when the rotor 22 rotates in the anti-drive direction R2, rotation of the rotor 22 is transmitted to the first output shaft 5 via the rotation transmitting structure 17, for example, the one-way clutch 17a. In other words, with the driving apparatus 1, rotation of the rotor 22 is transmitted to the first output shaft 5 by either the torque converter 15 or the rotation transmitting structure 17 (one-way clutch 17a) depending on the rotational direction of the rotor 22. With this configuration, the drive force of the motor 13 can be suitably transmitted to the first output shaft 5.

<Second Embodiment>

The configuration of a second embodiment is substantially the same as the configuration of the first embodiment except for the configuration of a rotation transmitting structure 117. Therefore, descriptions of configurations which are the same as the first embodiment are herein omitted and only configurations different to the first embodiment are given. Further, configurations which are the same as those in the first embodiment are denoted by the same reference symbols as those in the first embodiment.

The rotation transmitting structure 117 selectively transmits rotation of the rotor 22 to the first output shaft 5. The rotation transmitting structure 17 is disposed in the internal space S in the housing 10.

For example, the rotation transmitting structure 117 includes a planetary gear mechanism 118. The rotation transmitting structure 117 further includes an electromagnetic clutch 119.

The planetary gear mechanism 118 is disposed in the internal space S in the housing 10 between the rotor 22 and the first output shaft 5. The planetary gear mechanism 118 includes a ring gear 118a, a sun gear 118b, a planetary gear 118c and a carrier 118d.

The ring gear 118a is disposed radially outwardly. The rotor 22 is fixed to the ring gear 118a. The sun gear 118b is disposed on an inner peripheral portion of the ring gear 118a. The electromagnetic clutch 119 is connected to the sun gear 118b. The planetary gear 118c is disposed between the ring gear 118a and the sun gear 118b. The carrier 118d holds the planetary gear 118c. The first output shaft 5 is fixed to the carrier 118d.

The electromagnetic clutch 119 is disposed in the internal space S in the housing 10 between the planetary gear mechanism 118 and the housing 10. The electromagnetic clutch 119 switches between transmitting and not transmitting rotation of the rotor 22 to the first output shaft 5 via the planetary gear mechanism 118 depending on the rotational direction of the rotor 22.

A moving body 119a of the electromagnetic clutch 119 is mounted in the housing 10. More specifically, a plurality of the moving bodies 119a which are included in the electromagnetic clutch 119 are disposed in the circumferential direction (the rotational direction) with intervals therebetween and are held in the housing 10 so as to move in a radial direction.

The plurality of moving bodies 119a are configured such that the housing 10 and the sun gear 118b can be connected to each other. The plurality of moving bodies 119a are disposed opposing the sun gear 118b. Each of the plurality of moving bodies 119a is provided with a friction member (not shown). Each moving member 119a (friction member) is disposed at an interval from the sun gear 118b.

The plurality of moving bodies 119a either approach or separate from the sun gear 118b on the basis of a command output from the control unit 2. Under a state in which the plurality of moving bodies 119a (friction members) have separated from the sun gear 118b, the planetary gear mechanism 118 is idle and rotation of the rotor 22 is not transmitted to the first output shaft 5. Under this state, the electromagnetic clutch 119 cases a state in which the housing 10 and the sun gear 118b are not connected, that is, the clutch off state.

On the other hand, when the plurality of moving bodies 119a approach the sun gear 118b and the plurality of moving bodies 119a (friction members) have abutted against the sun gear 118b, rotation of the rotor 22 is transmitted to the first output shaft 5 via the planetary gear mechanism 118. Under this state, the electromagnetic clutch 119 cases a state in which the housing 10 and the sun gear 118b are connected, that is, the clutch on state.

Here, when the rotor 22 rotates in the drive direction R1, the electromagnetic clutch 119 is controlled by the control unit 2 so as to change to the clutch off state. In this case, rotation of the rotor 22 is transmitted to the first output shaft 5 via the torque converter 15.

On the other hand, when the rotor 22 rotates in the anti-drive direction R2, the electromagnetic clutch 119 is controlled by the control unit 2 so as to change to the clutch on state. In this case, rotation of the rotor 22 is transmitted to the first output shaft 5 via the planetary gear mechanism 118.

In this embodiment, drive force of the rotor 22 is amplified in the planetary gear mechanism 118 and transmitted to the first output shaft 5 through the rotor 22 and the first output shaft 5 being separately fixed to the ring gear 118a and the carrier 118d as described above.

Even with such a configuration, similar to the first embodiment, rotation of the rotor 22 is transmitted to the first output shaft 5 by either the torque converter 15 or the rotation transmitting structure 117 (planetary gear mechanism 118) depending on the rotational direction of the rotor 22. With this configuration, the drive force of the motor 13 can be suitably transmitted to the first output shaft 5.

<Other Embodiments>

The present advancement is not limited to the above-described first and second embodiments and may be changed or altered in various ways without departing from the scope of the present advancement.

(A) In the above-described first and second embodiments, there is described an example in which the turbine 27 rotates integrally with the first output shaft 5. Alternatively, the turbine 27 may be configured to rotate integrally with the first output shaft 5 in the drive direction R1 and to rotate with respect to the first output shaft 5 in the anti-drive direction R2.

Figure 5A:
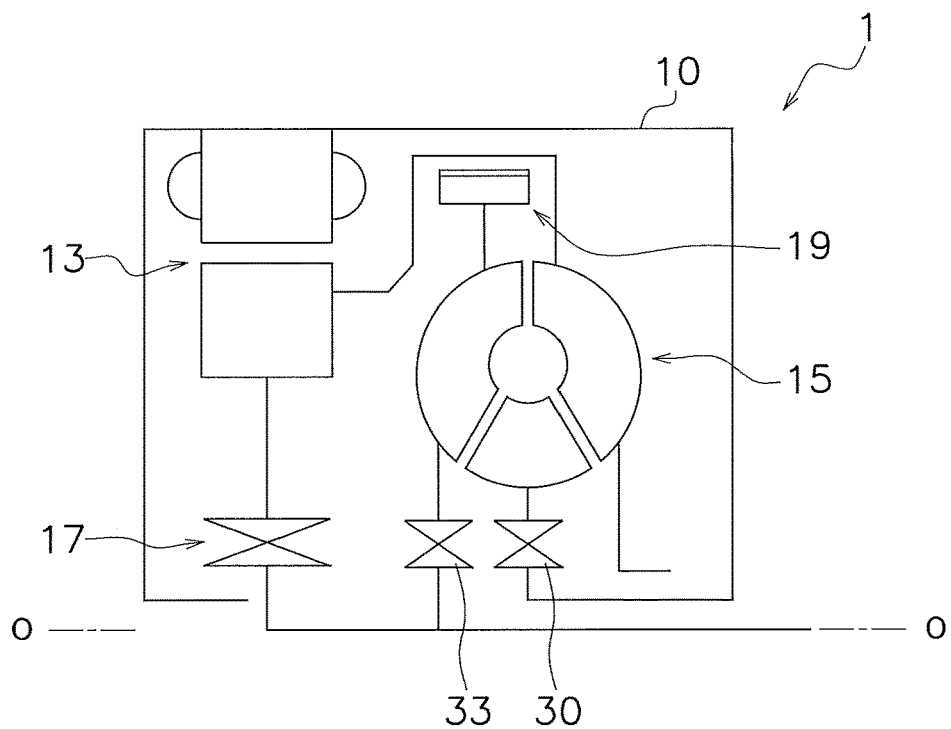
FIG. 5A is a schematic diagram of a driving apparatus according to another embodiment of the present advancement.
Figure 5B:
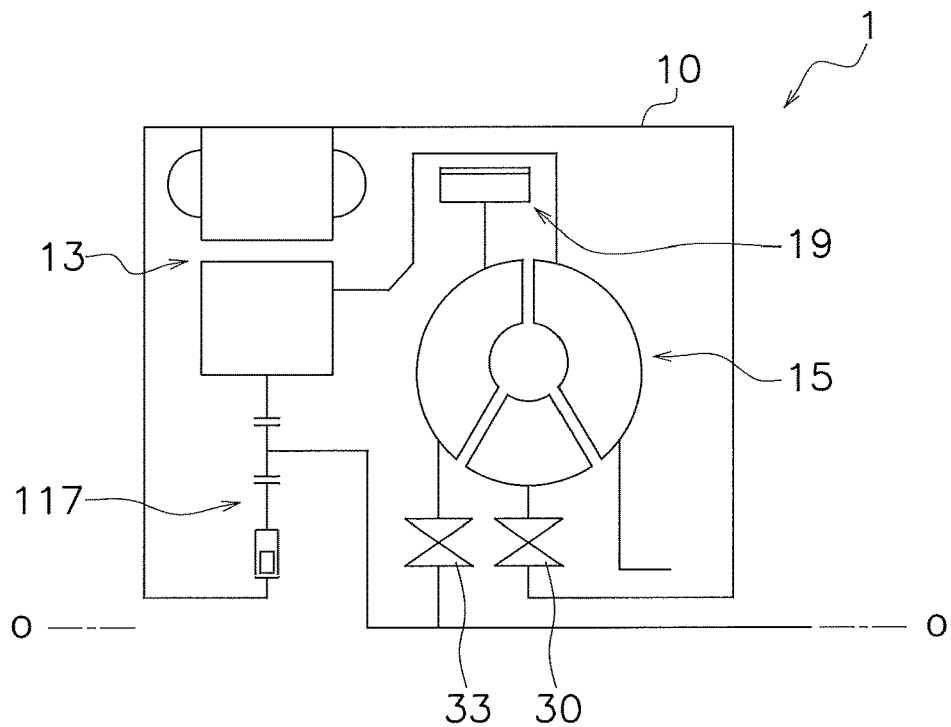
FIG. 5B is a schematic diagram of a driving apparatus according to another embodiment of the present advancement.

For example, as illustrated in FIGS. 5A and 5B, a one-way clutch 33 may be disposed between the turbine 27 and the first output shaft 5. In this case, when the turbine 27 rotates in the drive direction R1, the one-way clutch 33 rotates integrally with the turbine 27 and the first output shaft 5. On the other hand, when the turbine 27 rotates in the anti-drive direction R2, the one-way clutch 33 relatively rotates the turbine 27 and the first output shaft 5.

(B) In the above-described first and second embodiments, there is described an example in which the lockup structure 19 includes the centrifugal clutch 31. However, the lockup structure 19 may have another structure in which the impeller 25 and the turbine 27 can be connected/unconnected as described above. For example, each of the plurality of centrifuges 31a may be swingably held by the turbine shell 27a.

(C) In the above-described second embodiment, there is described an example in which the electromagnetic clutch 119 is used to control the planetary gear mechanism 118, but a clutch other than the electromagnetic clutch 119 may be used provided that the planetary gear mechanism 118 can be controlled as described above.

REFERENCE SYMBOLS LIST

1 Driving apparatus
5 First output shaft
10 Housing
13 Motor
15 Torque converter
17, 117 Rotation transmitting structure
17 One-way clutch
118 Planetary gear mechanism
119 Electromagnetic clutch
19 Lockup structure
21 First stator
22 Rotor

What is claimed is:

1. A driving apparatus for a vehicle for transmitting drive force to an output shaft, the driving apparatus comprising:
   a housing;
   an electric motor including a first stator fixed to the housing and a rotor configured to rotate relative to the first stator;
   a torque converter configured to transmit rotation of the rotor to the output shaft when the rotor rotates in a first rotational direction; and
   a rotation transmitting structure configured to transmit rotation of the rotor to the output shaft when the rotor rotates in a second rotational direction opposite to the first rotational direction.

2. The driving apparatus for a vehicle according to claim 1, wherein
   the rotation transmitting structure includes a clutch unit configured to transmit rotation of the rotor to the output shaft when the rotor rotates in the second rotational direction.

3. The driving apparatus for a vehicle according to claim 1, wherein
   the rotation transmitting structure further includes a planetary gear mechanism disposed between the rotor and the output shaft, and
   the planetary gear mechanism is configured to transmit rotation of the rotor to the output shaft when the rotor rotates in the second rotational direction.

4. The driving apparatus for a vehicle according to claim 1, wherein the torque converter includes:
   an impeller configured to rotate integrally with the rotor;
   a turbine configured to connect to the output shaft; and
   a second stator configured to rotate relative to the housing.

5. The driving apparatus for a vehicle according to claim 4, wherein
   the turbine is configured to rotate integrally with the output shaft.

6. The driving apparatus for a vehicle according to claim 4, wherein
   the turbine is configured to rotate integrally with the output shaft in the first rotational direction and to rotate relative to the output shaft in the second rotational direction.

7. The driving apparatus for a vehicle according to claim 4, further comprising:
   a lockup structure configured to connect the impeller and the turbine so that the impeller and the turbine rotate integrally.

8. The driving apparatus for a vehicle according to claim 4, wherein a case unit of the torque converter has a non-magnetic body.

* * * * *